Sept. 11, 1934.   E. W. SIBLEY   1,973,418
SHUT-OFF VALVE
Filed Dec. 18, 1933
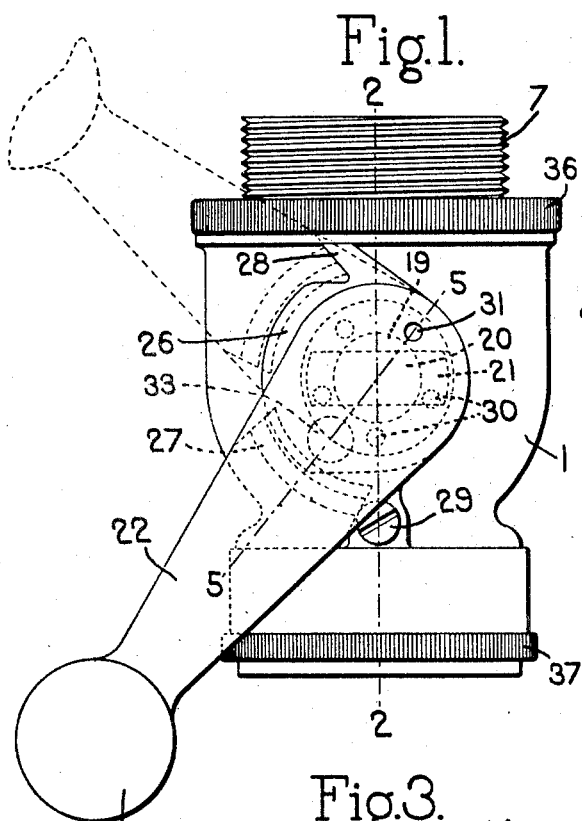
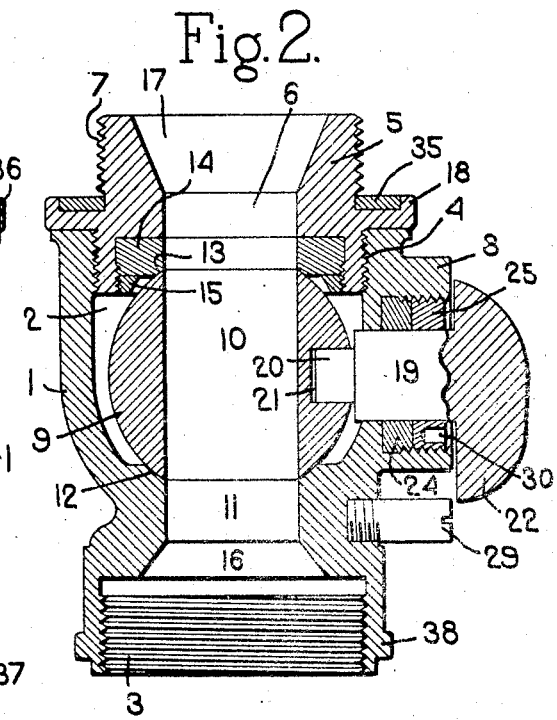
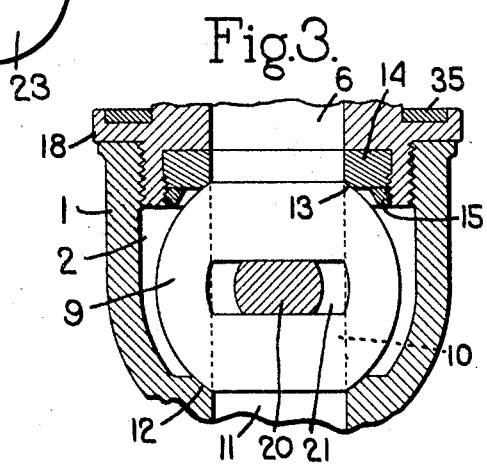
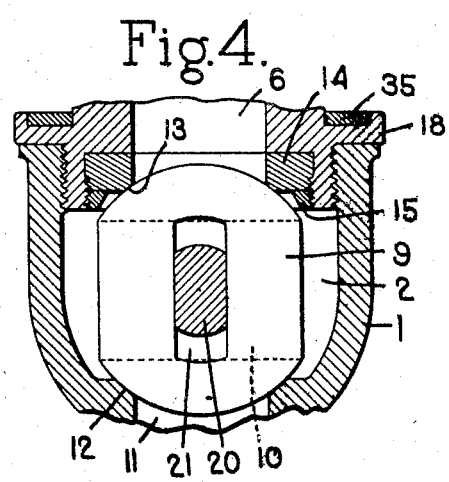
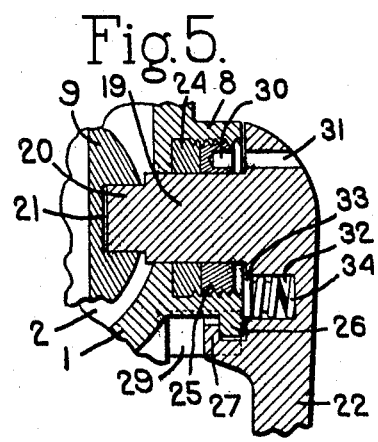
Inventor.
Edward W. Sibley
by Heard Smith & Tennant.
Attys.

Patented Sept. 11, 1934

1,973,418

UNITED STATES PATENT OFFICE 1,973,418

SHUT OFF VALVE

Edward W. Sibley, Hyde Park, Mass., assignor to Andrew J. Morse & Son., Inc., Boston, Mass., a corporation of Massachusetts Application December 18, 1933, Serial No. 702,921

6 Claims. (Cl. 251—153)

This invention relates to a shut-off valve which, while useful for the control of various fluids in various types of apparatus, is particularly useful and in the particular form herein illustrated is shown as designed for use in connection with the control of water in a hose such as a fire hose.

The object of the invention is to provide such a shut-off valve in which the movable valve member is in the form of a ball having a bore or passage therethrough and in which the entire construction is compact, readily assembled, efficiently guarded against leakage, protected against injury when subjected to rough usage or handling, and highly efficient in the control of the passage of the fluid therethrough.

This and other objects and features of the invention will appear more fully from the accompanying description and drawing and will be particularly pointed out in the claims.

The drawing illustrates the invention in a preferred form embodied in a valve suitable for use in connection with a fire hose or pipe or connection through which water is to be delivered. Such a valve may be built into the pipe or connection or, as here more particularly illustrated, may be screwed onto the end of a pipe, hose or other connection and then have the nozzle or another section of pipe or hose screwed on to the valve.

In the drawing:

Fig. 1 is a side elevation of the valve structure.

Fig. 2 is a view in longitudinal cross section taken on the line 2—2 of Fig. 1, with the handle stud and stop pin shown in elevation.

Fig. 3 is a detail of the construction in longitudinal cross section taken at right angles to that of Fig. 2 with the ball valve member shown in elevation and the handle stud in cross section with the ball valve member in open position.

Fig. 4 is a view similar to Fig. 3 with the ball valve member in closed position.

Fig. 5 is a detail in cross section taken on the line 5—5 of Fig. 1.

The valve as illustrated comprises a casing 1 which may be made of any suitable metal and which is formed to present the chamber 2. This casing is shown as presenting at the lower end an admission, and at the upper end an exit, opening. The admission opening is provided with an internal thread 3 by which the casing may be screwed on to the end of a hose or any other suitable connection. At the opposite or exit end the casing is likewise internally threaded at 4 to receive an externally threaded plug 5 and the exit port 6 is formed in this plug. The plug at its outer end is externally threaded at 7 to connect with a hose nozzle, pipe section or other connection. The casing is also formed at one side to present a boss 8 having a bearing aperture extending transversely therethrough.

A ball valve member of less diameter than the casing chamber 2 and of less diameter than the plug 5 is located in the casing chamber. This ball valve member 9 is made of a suitable metal and is in the form of a sphere and has a bore 10 passing therethrough. This bore is of substantially the same diameter as the diameter of the exit port 6 and as the diameter of an admission port 11 formed in the casing at the admission end. The ball valve member seats against an annular spherical valve seat 12 formed on the casing concentric the admission port 11 and also against a similar valve seat 13 formed on an annulus 14 inserted in the plug 5 concentric the exit port 6. The annulus 14 is held in place in a recess in the lower end of the plug 5 by the metal clamping ring 15. This annulus is preferably formed of a suitable, non-metallic, slightly compressible, valve seating material. This enables a watertight joint to be formed between the ball valve member and the valve seat without the necessity of expensive metal grinding and finishing operations.

When the valve is in open position, as shown in Figs. 2 and 3, the bore 10 of the ball valve member aligns with the admission port 11 and the exit port 6 and the water passes freely therethrough. Preferably the admission opening of the casing is provided with a converging section 16 terminating in the admission port 11 and the plug 5 with a diverging section 17 extending from the exit port 6. When the ball valve member is turned to closed position, as shown in Fig. 4, the solid spherical surface of the ball fits against the seat 13, thus shutting the exit port and likewise the solid spherical surface of the ball is opposed to the valve seat 12 shutting the admission port 11. In this closed position the pressure of the water forcing the ball valve member against the slightly compressible annulus 14 ensures and maintains a tight joint at the exit port.

Owing to the compressibility of the annulus 14, it is neither necessary nor desirable that there should be a tight fit between the ball valve member and the seat 12 and consequently water is admitted to the casing chamber 2 and forms a water jacket surrounding the ball valve member which protects the ball and the parts of the device against injury due to rough handling.

In assembling the device, the ball valve member is introduced through the opening at the upper end of the casing, the annulus 14 of proper thickness is inserted in the plug and secured in place by the clamping ring 15. Then the plug is screwed down until its rim 18 is firmly seated on the end of the casing. These parts are so designed and fitted that when thus assembled the valve seat 13 will press snugly against the ball valve member.

The ball valve member is operated between its open and closed positions by means of a handle having a stud journalled in the bearing aperture of the casing boss 8. The handle and stud in the preferred form of the invention constitute an integral metal part. The stud 19 of the handle which is journalled in the bearing aperture of the boss 8 terminates at its inner end in an oblong extension 20 and the ball is provided at one side with a recess 21 of substantially the same width but of greater length than the extension 20. It will thus be seen that when the stud 19 is rotated, the ball valve member will also be rotated and that when the stud is turned to a position where the recess 21 in the ball valve member is parallel to the axis of the exit port, as shown in Fig. 4, the ball valve member will be free to be forced firmly against the valve seat 13. Beyond the boss 8 the stud 19 is connected, preferably integrally, with the handle 22 which projects radially therefrom alongside the casing and terminates in a ball-shaped knob 23.

A water-tight joint is formed between the stud 19 and the bearing aperture in the boss 8. This is secured by forming in the boss beneath the portion of the handle which overlies the boss an internally threaded recess concentric the stud 19. In this recess is mounted an annular packing 24. An annular gland nut 25 is threaded into the recess and when screwed down compresses the packing 19, forcing it radially inward against the stud 19 and thus forming a watertight joint.

In order to prevent separation of the handle member from the casing and ensure the proper cooperative relation between the handle member and the ball valve member, the boss 8 is provided at its outer end with a projecting rim 26 extending part way therearound and the handle at its inner face is provided with a lug 27 extending beneath the rim and interlocking therewith. The lug and rim are so located and proportioned, as shown, that they remain in interlocking engagement throughout the entire movement of the handle between open and closed positions. The closed position is preferably defined by the engagement of one end of the lug 27 with a projection 28 on the casing, while the open position is defined by the engagement of the other end of the lug with a pin 29 removably mounted in the casing by threaded engagement therewith. It will thus be seen that the rotation of the handle is limited to an angle in which the lug remains interlocked with the rim by means of the limiting stops 28 and 29 and that by the removal of one of these, in the case illustrated the pin 29, the handle may be rotated further to disengage the lug from the rim and thus permit the removal and replacement of the handle and its stud 19 in the casing.

Since it is important that the packing 24 shall be compressed by the gland nut 25 after the handle is in operative position, means are provided for rotating the gland nut with the handle in position. For this purpose the gland nut is shown as provided at its outer end with a plurality of recesses 30 arranged concentric of the stud 19 and the handle is provided with a hole 31 extending therethrough opposite the said recesses. Consequently by inserting a pin in the hole 31 and thence into one or the other of the recesses and by rotating the handle, the gland nut may be rotated in either direction as required to tighten or loosen the packing 25.

It is desirable to provide friction resistance to assist in preventing accidental movement of the handle and for this purpose the handle is shown as provided at its interior face opposite the boss 8 with a recess 32 in which is mounted a small plunger 33 held pressed against the boss by a coil spring 34.

The invention thus presents a very compact, simple, and efficient construction. The parts are readily assembled by means of the plug which allows the ball valve member to be inserted in and removed from the casing at the exit opening and by means of the separable interlocking connection of the handle and its stud with the boss at the side of the casing which allows the handle and stud to be connected to and disconnected from the ball valve member and the casing. The ball valve member is protected by the water jacket and when in closed position it tightly shuts the exit port being held against the valve seat by the pressure of the water. The construction is readily manufactured and without the necessity of refinements in the fitting of the parts. The plug at the exit opening may be shaped and varied as to size at its outer end in accordance with the part to which it is to be connected. Consequently plugs of various sizes and character may be employed with the same casing. In the construction illustrated the plug has seated in the rim 18 a gasket 35 to ensure a tight joint between the plug and the part to which it is connected. The plug at the periphery of the rim is preferably provided with a milled surface 36 and a similar milled surface 37 is formed on an annular rib 38 at the opposite end of the casing to provide a firm grip for the hands of the operator. The one-piece stud and handle construction ensures strength and the shape of the handle particularly with the ball knob 23 at the end enables the handle to be radially gripped and moved by the operator. There is no opportunity for leakage of water from the casing because the plug is always screwed down to a firm and tight seat in the casing and the packing 24 with the adjustable gland nut 25 ensures a tight joint where the stud 19 enters the casing.

Having thus described the invention, what is claimed as new, and desired to be secured by Letters Patent, is:

1. A shut-off valve comprising a chambered casing having admission and exit ports and a boss at one side having a bearing aperture; a ball valve in the casing chamber having a bore therethrough in alignment with the admission and exit ports when in open position and shutting the exit port when in closed position; a handle having a stud journalled in the boss bearing aperture and separably connected to the ball valve; a projecting rim extending part way around the boss; a lug on the handle extending beneath the rim to interlock therewith and when thus interlocked to prevent the removal of the handle from the casing; and means for limiting the rotation of the handle to an angle in which the lug remains interlocked with the rim.

2. A shut-off valve comprising a chambered casing having admission and exit ports and a boss at one side having a bearing aperture; a ball valve in the casing chamber having a bore therethrough in alignment with the admission and exit ports when in open position, shutting the exit port when in closed position, and having an oblong recess in its side opposite the boss bearing aperture with its major axis parallel with the bore; a handle having a stud journalled in the boss bearing aperture terminating in an oblong extension of less length than and fitting into the ball recess; a projecting rim extending part way around the boss; a lug on the handle extending beneath the rim to interlock therewith and when thus interlocked to prevent the removal of the handle from the casing; and means for limiting the rotation of the handle to an angle in which the lug remains interlocked with the rim.

3. A shut-off valve comprising a chambered casing having admission and exit ports and a boss at one side having a bearing aperture; a ball valve in the casing chamber having a bore therethrough in alignment with the admission and exit ports when in open position, shutting the exit port when in closed position, and having an oblong recess in its side opposite the boss bearing aperture with its major axis parallel with the bore; a handle having an integral stud journalled in the boss bearing aperture terminating in an oblong extension of less length than and fitting into the ball recess; a projecting rim extending part way around the boss; a lug on the handle extending beneath the rim to interlock therewith and when thus interlocked to prevent the removal of the handle from the casing; and a pair of stops on the casing, one at least of which is removable, for limiting the rotation of the handle to an angle in which the lug remains interlocked with the rim and for permitting the removal and replacement of the handle and stud.

4. A shut-off valve comprising a chambered casing having admission and exit ports and a boss at one side having a bearing aperture; a ball valve in the casing chamber having a bore therethrough in alignment with the admission and exit ports when in open position and shutting the exit port when in closed position; a handle comprising a stud journalled in the boss bearing aperture and separably connected to the ball valve, and an arm extending radially from the stud; separable means for interlocking the handle and casing to prevent endwise movement of the stud; an annular packing in the boss concentric with the stud and fitting thereagainst; and a gland nut concealed by the handle, threaded in the boss concentric with the stud and acting to force the packing against the stud, the said nut having a plurality of recesses in its outer end arranged concentric with the stud, and the handle having a hole therethrough opposite the said recesses.

5. A shut-off valve comprising a chambered casing having an opening at one end presenting an admission port, an opening at the opposite end, a plug removably secured in the latter opening and presenting an exit port in alignment with the admission port and a boss at one side having a bearing aperture transversely therethrough; a ball valve member of less diameter than the casing chamber and the plug having a bore therethrough in alignment with the admission and exit ports when in open position, shutting the exit port when in closed position, and having an oblong recess in its side opposite the boss bearing aperture with its major axis parallel with the bore; an annular compressible valve seat mounted in the inner end of the plug concentric with the exit port and fitting the surface of the ball valve member; a handle having a stud journalled in the boss bearing aperture and terminating in an oblong extension of less length than and fitting into the recess in the ball member; an annular packing in the boss concentric with the stud and fitting thereagainst; a gland nut threaded in the boss concentric with the stud and acting to force the packing against the stud, the said nut having a plurality of recesses in its outer end arranged concentric with the stud, and the handle having a hole therethrough opposite the said recesses.

6. A shut-off valve comprising the construction defined in claim 1, in which the handle at its face opposite the boss is provided with a recess and in which a spring-pressed plunger is mounted in the recess and frictionally engages the boss.

EDWARD W. SIBLEY.